May 12, 1936.     E. L. CHAPPELL     2,040,766
PIPE COUPLING
Filed Sept. 27, 1934
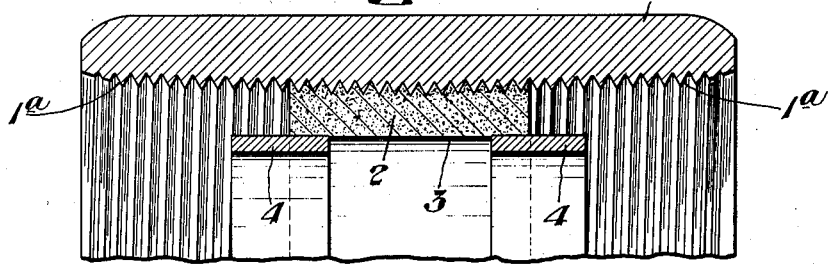
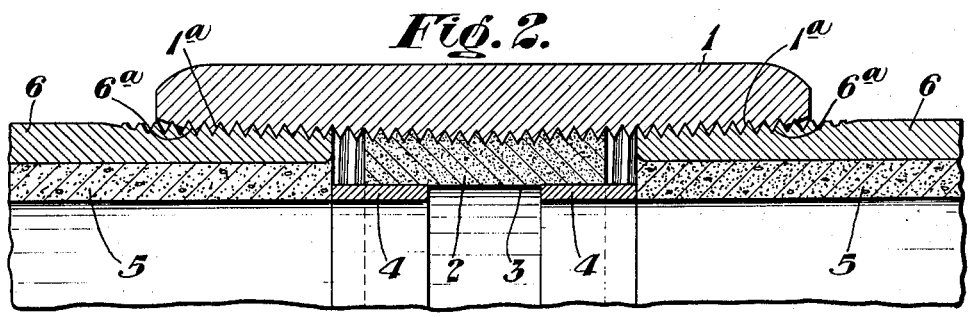
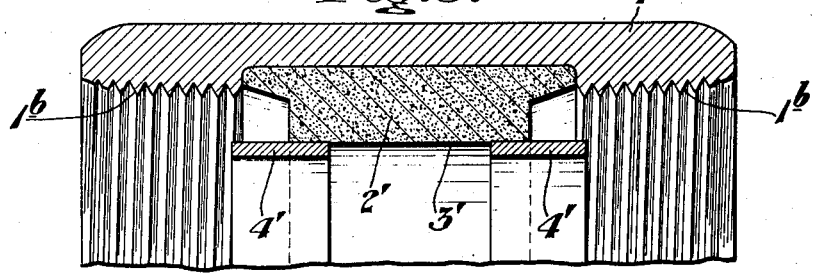
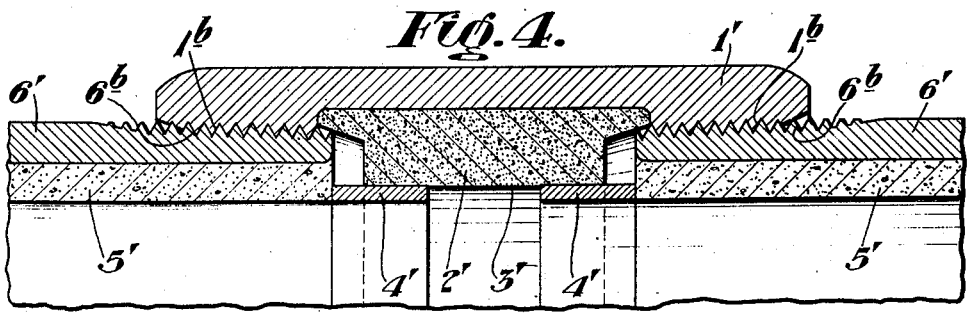
Inventor:
EUGENE L. CHAPPELL,
by his Attorneys Patented May 12, 1936

2,040,766

UNITED STATES PATENT OFFICE 2,040,766

PIPE COUPLING

Eugene L. Chappell, Pittsburgh, Pa., assignor to National Tube Company, a corporation of New Jersey Application September 27, 1934, Serial No. 745,789

2 Claims. (Cl. 285—148)

This invention covers an improved pipe coupling, one of the objects being to protect both the threads on this coupling and on the ends of the pipes which it joins against the action of the fluid flow. Other objects may be inferred.

A specific example of the coupling and a modification thereof are illustrated by the accompanying drawing, in which:

Figure 1 is a longitudinal section of the coupling as it appears before use.

Figure 2 is a longitudinal section showing the coupling in use.

Figure 3 is a longitudinal section of the modification as it appears before use.

Figure 4 is a longitudinal section showing the modification in use.

More specifically, Figures 1 and 2 show a metallic pipe coupling 1 interiorly carrying a centrally arranged non-metallic member 2 providing a cylindrical bore 3 that is concentric therewith, and having cylindrical rings 4 of corrosion-resistant metal tightly fitted within this bore.

The member 2 and the rings 4 are respectively constructed and arranged so that the ends of the latter substantially register with the ends of the linings 5 of cement-lined metallic pipes 6 received by the coupling, and so that the rings 4 may move sufficiently to accommodate longitudinal movement of the pipes respecting the coupling, which is incidental to tightening operations. The inside diameters of the rings 4 are substantially the same as those of the linings 5, and the outside diameters of the rings 4 are substantially less than the outside diameters of the linings 5.

The couplings 1 and the pipes 6 are respectively provided with the usual threads 1ª and 6ª.

Figure 1 shows the position of the rings 4 within the bore 3 before the coupling is used. Figure 2 shows the positions of these rings after they have moved together to accommodate the longitudinal movement resulting from the screw action of the respective threads. The member 3 may be made of the same material as that with which the pipes 6 are lined or it may be made of bakelite or other non-metallic material. Although the rings 4 are tightly fitted within the bore 3, they are not so tightly fitted but what they may slide sufficiently to permit the required movements.

Cement-lined pipes are usually used to conduct corrosive fluids, and these fluids have a decidedly damaging effect on the threads of an ordinary pipe coupling. This effect is not so pronounced when the fluids are at rest, but is normally only serious when the fluids are moving. Therefore, the rings 4 of corrosion-resistant metal function as shields between the fluid flow and the threads, while the non-metallic member 3 and the particular construction of the rings 4 prevents the formation of an electric couple which might result if the rings directly contacted either the metal of the pipes 6 or of the coupling 1, it being kept in mind that these are usually made of steel.

In the case of the example just described, the member 2 is held in place by the threads 1ª of the coupling 1.

In the case of the modification shown by Figures 3 and 4, the non-metallic member is mounted in a recess 1ᵇ which is centrally formed within the coupling. Since the various parts and their respective functions are the same as have already been described in connection with the example shown by the first two figures, no further description of the modification will be attempted. Its various parts are numbered the same as are those of the first example, excepting that they are primed for identification purposes, the threads on the coupling and pipes being respectively indicated at 1ᶜ and 6ᵇ.

I claim:

1. A pipe coupling interiorly carrying a centrally arranged member providing a cylindrical bore that is concentric therewith and having at least one cylindrical ring tightly fitted within said bore, said member and said ring being respectively constructed and arranged so that the end of the latter substantially registers with the end of the lining of a lined pipe received by said coupling and so that said ring may move within said bore sufficiently to accommodate longitudinal movement of said pipe respecting said coupling incidental to tightening operations, the inside diameter of said ring being substantially the same as that of said lining and the outside diameter of said ring being substantially less than the outside diameter of said lining.

2. A metallic pipe coupling interiorly carrying a centrally arranged non-metallic member providing a cylindrical bore that is concentric therewith and having at least one cylindrical ring of corrosion-resistant metal tightly fitted within said bore, said member and said ring being respectively constructed and arranged so that the end of the latter substantially registers with the end of the lining of a cement-lined pipe received by said coupling and so that said ring may move sufficiently to accommodate longitudinal movement of said pipe respecting said coupling incidental to tightening operations, the inside didental to tightening operations, the inside diameter of said ring being substantially the same as that of said lining and the outside diameter of said ring being substantially less than the outside diameter of said lining.

EUGENE L. CHAPPELL.